United States Patent [19]

Smith et al.

[11] 4,084,675
[45] Apr. 18, 1978

[54] POTENTIOMETER HAVING IMPROVED OPERATING MEANS

[75] Inventors: Lee H. Smith; Norman J. Alexandrowicz, both of Waukegan, Ill.

[73] Assignee: Dynapar Corporation, Gurnee, Ill.

[21] Appl. No.: 717,285

[22] Filed: Aug. 24, 1976

[51] Int. Cl.² ............... F16D 11/00; G05G 1/12; G05G 5/04
[52] U.S. Cl. .................................. 192/95; 74/10.2; 74/526; 74/548; 74/553; 192/67 R
[58] Field of Search ............. 192/67 R, 95; 74/10 R, 74/10.2, 526, 548, 553; 251/96

[56] References Cited

U.S. PATENT DOCUMENTS

| | | | |
|---|---|---|---|
| 1,537,695 | 5/1925 | Riley | 74/526 X |
| 1,825,364 | 9/1931 | Ross | 74/526 |
| 2,501,008 | 3/1950 | Schramm | 74/548 |
| 2,780,333 | 2/1957 | Reiser et al. | 192/67 R |
| 2,829,538 | 4/1958 | Mueller | 251/96 X |
| 2,978,940 | 4/1961 | Jeanneret | 74/526 X |
| 3,210,040 | 10/1965 | Thurlow | 251/96 |
| 3,986,409 | 10/1976 | Tripp et al. | 192/95 |

Primary Examiner—Allan D. Herrmann
Attorney, Agent, or Firm—Andrus, Sceales, Starke & Sawall

[57] ABSTRACT

A potentiometer has a disc mounted on the shaft. A knob embraces the end of the shaft and is biased away from the disc. The knob is slidable along the shaft into engagement with the disc so that rotation of the knob operates the potentiometer.

7 Claims, 3 Drawing Figures

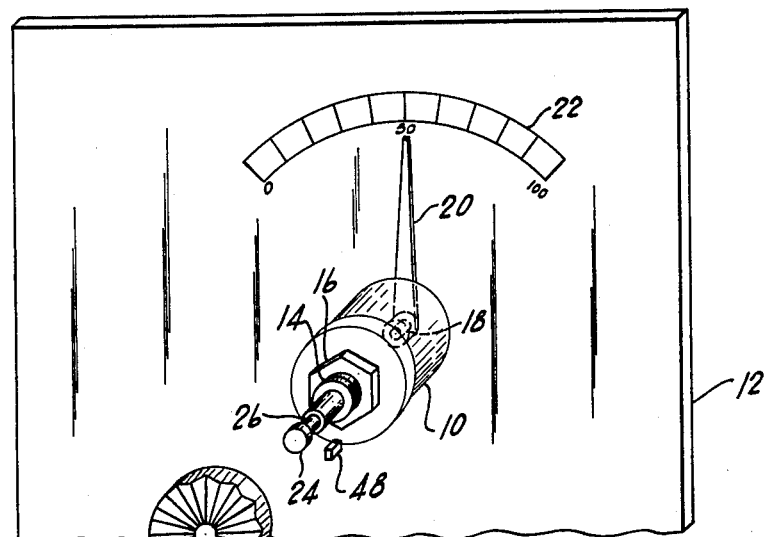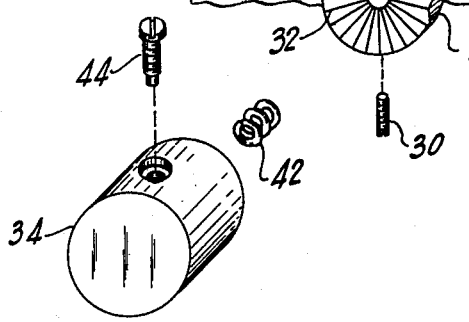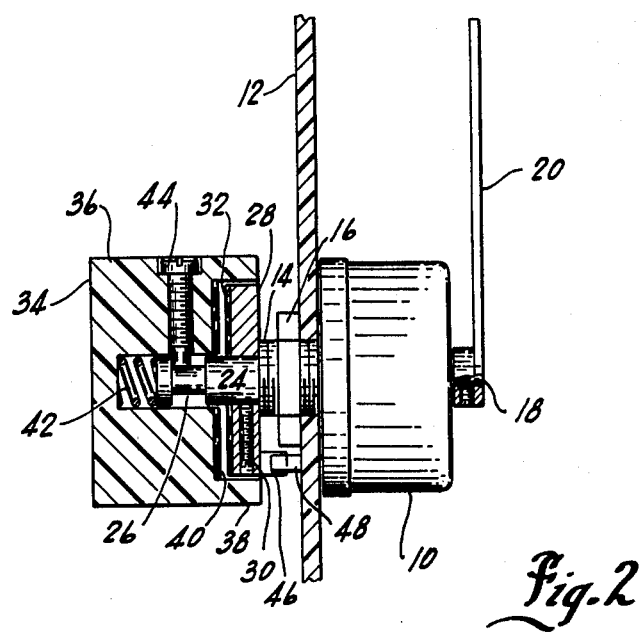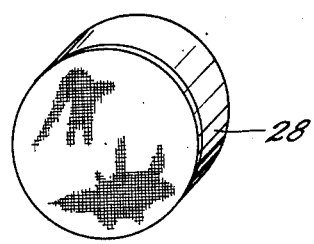
Fig. 1
Fig. 2
Fig. 3

4,084,675

POTENTIOMETER HAVING IMPROVED OPERATING MEANS

BACKGROUND OF THE PRESENT INVENTION

A potentiometer includes a resistive element, usually arranged in a semicircular configuration. A sliding contact is movable along the resistive element, as by rotating a shaft containing the contact. The resistive element and slider are electrically connected so that the device functions as an adjustable voltage divider or rheostat.

Potentiometers may be used for the control of a wide variety of electronic and electric equipment. Rotation of the potentionmeter shaft alters the resistance of the potentiometer and effects the desired control in the apparatus.

In many instances, it is necessary or desirable to prevent inadvertant movement of potentiometer knob from operating the potentiometer and altering the condition of the equipment controlled thereby. It is further often necessary or desirable to limit the amount by which the potentiometer shaft may be rotated so as to limit certain operative conditions in the equipment.

SUMMARY OF THE PRESENT INVENTION

The present invention provides a means which both prevents inadvertent operation of the potentiometer and restricts its intentional operation to desired limits.

The present invention includes a disc mounted on the potentiometer shaft for rotation therewith. The disc contains engagement means such as serrations or fabric. A knob embraces the end of the shaft and is slidably retained thereon for rotation with respect to the shaft. The knob also contains engagement means and the knob is slidable along the shaft against the pressure of a bias means to bring the engagement means together for causing rotation of the knob to rotate the shaft.

BRIEF DESCRIPTION OF THE DRAWING

FIG. 1 is an exploded perspective view of the improved potentiometer knob of the present invention;

FIG. 2 is a side view, partially in cross section, of the improved potentiometer of the present invention.

FIG. 3 is a perspective view of an element of the potentiometer of the present invention.

DETAILED DESCRIPTION OF THE PREFERRED EMBODIMENT

Potentiometer 10 containing the usual resistance and slider, not shown, may be mounted on sheet 12, by collar 14 and nut 16. Potentiometer 10 may be of the type having a rearward shaft extension 18 containing pointer 20. Sheet 12 is preferably formed of clear plastic and contains scale 22 for coaction with pointer 20.

Potentiometer 10 also contains a forward shaft extension 24 which extends through collar 14 and contains groove 26 near the end. A disc 28 is mounted on shaft 24 adjacent collar 14 and affixed to the shaft by set screw 30. The exposed surface of this disc 28 is textured, as by serrations 32.

The construction of knob 34 is best shown in FIG. 2. Knob 34 contains base 36 from which extends peripheral flange 38. Base 36 contains a central hole for rotatably receiving the end of shaft 24. The inner surface of base 36, between the inside of flange 38 and the central hole contains serrations 40. When knob 34 is assembled on shaft 24, spring 42 is placed in the bottom of the central hole of knob 34. Set screw 44 is threaded through base 36 of knob 26 on shaft 24 to retain knob 34 on shaft 24. The end of set screw 44 avoids contact with the bottom of groove 26 or only lightly contacts the bottom of the groove. The bias provided by spring 42 forces the surface of base 36 containing serrations 40 away from the opposing face of disc 28.

In operation, spring 42 biases knob 34 outward on shaft 24. With knob 34 so positioned, rotation of knob 34 does not produce rotation of shafts 24 and 18, pointer 20, and the operative portion of potentiometer 10, since there is little or no contact between set screw 44 and the bottom of groove 26. When knob 34 is pushed toward sheet 12 along shaft 24, against the bias of spring 42, serrations 40 on base 36 engage serrations 32 on disc 28 causing rotation of knob 34 to rotate the operative portion of potentiometer 10. Release of knob 34 terminates the operation of potentiometer 10.

It is often desired to restrict the amount by which the operative elements of potentiometer 10 may be rotated to limit, for example, the temperature of an oven or the speed of a motor controlled by potentiometer 10. To this end, a projection 46 may be provided on the surface of disc 28 facing sheet 12. An interfering projection 48 is provided on sheet 12.

Knob 34 is removed and disc 28 loosened on shaft 24 by unthreading set screw 30. Shaft 24 is moved to the position of greatest desired rotation. Disc 28 is rotated until projection 46 abuts projection 48 in a manner which will prevent further undesired rotation of shaft 24. Set screw 30 is then tightened to lock disc 28 in that position on shaft 24. Knob 34 is then replaced. The movement of potentiometer 10 will be limited by the interference of projections 46 and 48 at the point of maximum desired rotation.

Since the normal rotation of shaft 24 is less than 360°, disc 28 may be located on shaft 24 at a position in which projection 48 does not interfere with the operation of potentiometer 10 in the event this limiting feature is not desired.

While disc 28 and knob 36 have been described above as containing mutually engaging serrations for transmitting rotation from knob 34, through disc 28 to shaft 24, it will be appreciated that other means may be employed. For example, fabric, such as felt, may be applied to the opposing surfaces of disc 28 and knob 34 to provide the required coupling action. Other modifications to the present invention may also be made, if desired.

Various modes of carrying out the invention are contemplated as being within the scope of the following claims particularly pointing out and distinctly claiming the subject matter which is regarded as the invention.

We claim:

1. In a potentiometer having a shaft, an improved operating means comprising:

a disc mounted on said shaft for rotation therewith, said disc having a first surface lying generally normal to the shaft and containing engagement means, said shaft containing a circumferential groove located intermediate said first surface and the end of said shaft; and a knob embracing the end of the shaft having a set screw insertable in said groove for slidably retaining said knob on the shaft while permitting rotation thereof with respect to said shaft, said knob having a second surface containing engagement means lying generally normal to the shaft and facing said first surface, said knob containing means for biasing said surfaces apart, said knob being slidable along the shaft for bringing said first and second surfaces into engagement for causing rotation of said knob to rotate the shaft.

2. The improvement according to claim 1, wherein said biasing means comprises an extensible spring interposed between the end of said shaft and said knob.

3. The improvement according to claim 1, where said knob includes a peripheral flange surrounding said disc.

4. The improvement according to claim 1 wherein said engagement means comprises serrations.

5. The improvement according to claim 1 wherein said engagement means comprises fabric.

6. The improvement according to claim 1 further defined as including means for limiting the rotation of the potentiometer shaft, said means including a projection on the potentiometer coactable with a projection on said disc upon the rotation of the shaft, said disc being adjustably mounted on the shaft.

7. The improvement according to claim 6 wherein said projections interfere upon the rotation of the shaft and wherein the rotary position of said disc on the shaft is adjustable.

* * * * *